United States Patent
Andriolo et al.

(10) Patent No.: US 12,189,390 B2
(45) Date of Patent: Jan. 7, 2025

(54) OUTDOOR ROBOT AND CONTROL METHOD THEREFOR

(71) Applicant: Positec Power Tools (Suzhou) Co., Ltd., Suzhou (CN)

(72) Inventors: Paolo Andriolo, Vicenza (IT); Federico Testolin, Vicenza (IT); Davide Dalfra, Mantua (IT); Emanuel Conti, Falciano (SM)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 311 days.

(21) Appl. No.: 17/642,665

(22) PCT Filed: Jun. 4, 2020

(86) PCT No.: PCT/CN2020/094350
§ 371 (c)(1),
(2) Date: May 4, 2022

(87) PCT Pub. No.: WO2021/047213
PCT Pub. Date: Mar. 18, 2021

(65) Prior Publication Data
US 2022/0326709 A1    Oct. 13, 2022

(30) Foreign Application Priority Data

Sep. 12, 2019   (CN) ..................... 201910866648.X (51) Int. Cl.
*G05B 19/4155*  (2006.01)
*G05D 1/00*  (2006.01)

(52) U.S. Cl.
CPC ......... *G05D 1/021* (2013.01); *G05B 19/4155* (2013.01); *G05B 2219/50391* (2013.01)

(58) Field of Classification Search
CPC .... B27B 5/02; B27B 5/29; A01G 3/08; A01D 34/828; A01D 34/008; A01B 35/30;
(Continued)

(56) References Cited

U.S. PATENT DOCUMENTS

2002/0035878 A1    3/2002   Norton

FOREIGN PATENT DOCUMENTS

| CN | 103053265 A | 4/2013 |
| CN | 103053265 B | 10/2014 |

(Continued)

OTHER PUBLICATIONS

First Office Action in CN application No. CN201910866648.X, dated Mar. 1, 2023.
(Continued)

*Primary Examiner* — Khoi H Tran
*Assistant Examiner* — Bryant Tang
(74) *Attorney, Agent, or Firm* — Lee & Hayes, P.C.

(57) ABSTRACT

A outdoor robot includes an execution apparatus and an execution motor for driving the execution apparatus to perform a work task. The control method includes: obtaining a load parameter of the execution motor during running of the outdoor robot; calculating a change rate parameter of a load; and when it is determined that the change rate parameter of the load represents that the load increases and the change rate parameter of the load exceeds a preset threshold range, braking running of the execution apparatus.

20 Claims, 7 Drawing Sheets

(58) Field of Classification Search
CPC ... H02G 1/02; B25J 9/08; B25J 9/1605; B25J 9/1656; B25J 11/008; G05D 1/0246; G05D 1/021; G05D 1/0214; G05D 1/0227; G05B 19/042; G05B 19/4155; G05B 19/048; G05B 2219/50391
See application file for complete search history.

(56) References Cited

FOREIGN PATENT DOCUMENTS

| | | | |
|---|---|---|---|
| CN | 106272436 | A | 1/2017 |
| CN | 106483846 | A | 3/2017 |
| CN | 106487286 | A | 3/2017 |
| CN | 107813345 | A | 3/2018 |
| CN | 108152736 | A * | 6/2018 |
| CN | 108406954 | A | 8/2018 |
| CN | 108556068 | A | 9/2018 |
| CN | 106272436 | B | 10/2018 |
| CN | 109826551 | A | 5/2019 |
| CN | 109842350 | A * | 6/2019 |
| CN | 109995307 | A | 7/2019 |
| CN | 210049810 | U | 2/2020 |
| DE | 11 2013 006 236 | T5 | 10/2015 |
| WO | 2014/121423 | A1 | 8/2014 |
| WO | WO-2016186933 | A2 * | 11/2016 ............ B25J 19/023 |
| WO | WO-2017036401 | A1 * | 3/2017 |
| WO | 2018/137687 | A1 | 8/2018 |
| WO | WO2018/137687 | A | 8/2018 |

OTHER PUBLICATIONS

First search in CN application No. CN201910866648.X,dated.Mar. 1, 2023.
Extended European search report in EP application No. EP20863456.8,dated Jan. 4, 2023.
International Search Report in application No. PCT/CN2020/094350, dated Jun. 4, 2020.
Written Opinion in application No. PCT/CN2020/094350, dated Jun. 4, 2020.

* cited by examiner

OUTDOOR ROBOT AND CONTROL METHOD THEREFOR

This application is a National Stage Application of International Application No. PCT/CN2020/094350, filed on Jun. 4, 2020, which claims benefit of and priority to Chinese Patent Application No. 201910866648.X, filed on Sep. 12, 2019, all of which are hereby incorporated by reference in their entirety for all purposes as if fully set forth herein.

TECHNICAL FIELD

The present disclosure, including embodiments of the invention, relates to the field of automatic control of robots, and specifically to an outdoor robot and a control method thereof.

BACKGROUND

With the development of science and technology, self-moving devices in various fields become popular. Self-moving devices can automatically perform preset related tasks through preset programs without human operation and intervention, and are therefore widely applied to industrial applications and household products. Household products such as gardening robots, cleaning robots, and snow removal robots greatly save people's time and bring great convenience to industrial production and home life.

At present, the application of outdoor robots has become very popular. When an outdoor robot performs a work task in a working area, the outdoor robot performs the work task through a running execution apparatus. If an organism touches the execution apparatus that runs at a high speed, the execution apparatus may cause harm to the organism. For example, if a user's robotic lawnmower performs a mowing task in a garden and an organism such as a child or a small animal touches a running cutting apparatus while playing in the garden, the cutting apparatus may cause harm to the child or the small animal Therefore, how to reduce the harm caused by an execution apparatus of an outdoor robot to an organism is an urgent problem to be resolved.

SUMMARY

A technical problem to be resolved by the embodiments of the present disclosure is to provide an outdoor robot and a control method thereof that can determine in time and accurately whether the execution apparatus touches an obstacle such as an organism. The outdoor robot can run more reliably and safely.

Therefore, the embodiments of the present disclosure provide a control method of an outdoor robot, the outdoor robot includes an execution apparatus and an execution motor for driving the execution apparatus to perform a work task, and the control method includes the following steps:
  obtaining a load parameter of the execution motor during running of the outdoor robot;
  obtaining a change rate parameter of a load according to the load parameter; and
  when it is determined that the change rate parameter of the load represents that the load increases and the change rate parameter of the load exceeds a preset threshold range, braking the execution apparatus.

In some embodiments, the change rate parameter of the load includes a first derivative or an $n^{th}$ derivative of the load parameter.

In some embodiments, the change rate parameter of the load includes a change amount of the load parameter within a preset time interval, and when it is determined that a change amount of the load parameter represents that the load increases and the change amount of the load parameter within the preset time interval is greater than or equal to a preset threshold, braking the execution apparatus.

In some embodiments, the braking the execution apparatus includes reducing or stopping a speed output or an energy output of the execution motor.

In some embodiments, the load parameter of the execution motor includes at least one of a rotational speed of the execution motor, a current of the execution motor, or a torque of the execution motor. In some embodiments, the load parameter of the execution motor includes a rotational speed of the execution motor, and when it is determined that a change rate of the rotational speed of the execution motor is greater than or equal to a preset threshold, braking the execution apparatus.

In some embodiments, the obtaining a load parameter of the execution motor during running of the outdoor robot includes: obtaining a first load parameter at a first time point, and obtaining a second load parameter at a second time point after a preset time interval; and obtaining the change rate parameter of the load of the execution motor based on a difference between the first load parameter and the second load parameter.

In some embodiments, a range of the preset time interval is 0.1 s to 10 s.

the range of the preset time interval is 0.1 s to 2 s. In some embodiments, the preset time interval is 0.5 s.

In some embodiments, the outdoor robot further includes a movement apparatus and a driving motor used for driving the movement apparatus to move, and the control method further includes: when it is determined that the change rate parameter of the load of the execution motor represents that the load increases and the change rate parameter of the load exceeds a preset threshold range, braking the movement apparatus. In some embodiments, the outdoor robot includes a robotic lawnmower, the execution apparatus includes a cutting apparatus, and the execution motor includes a cutting motor.

Correspondingly, the embodiments of the present disclosure also provide an outdoor robot, which includes:
  a housing; a movement apparatus, mounted on the housing, and used for driving the outdoor robot to move; and an execution apparatus and an execution motor, mounted on the housing, the execution motor running to drive the execution apparatus to perform a work task; the outdoor robot further includes a control apparatus, and the control apparatus is configured to control the execution motor to run to drive the execution apparatus to perform a work task and is configured to control the movement apparatus to drive the outdoor robot to move, the control apparatus is further configured to:
  obtain a load parameter of the execution motor during running of the outdoor robot;
  obtain a change rate parameter of a load according to the load parameter; and
  when it is determined that the change rate parameter of the load represents that the load increases and the change rate parameter of the load exceeds a preset threshold range, brake the execution apparatus.

In some embodiments, the change rate parameter of the load includes a first derivative or an $n^{th}$ derivative of the load parameter.

In some embodiments, the change rate parameter of the load includes a change amount of the load parameter within a preset time interval, and when it is determined that a change amount of the load parameter represents that the load increases and the change amount of the load parameter within the preset time interval is greater than or equal to a preset threshold, braking the execution apparatus.

In some embodiments, the braking the execution apparatus includes reducing or stopping a speed output or an energy output of the execution motor.

In some embodiments, the load parameter of the execution motor includes at least one of a rotational speed of the execution motor, a current of the execution motor, or a torque of the execution motor.

In some embodiments, the load parameter of the execution motor includes a rotational speed of the execution motor, and when it is determined that a change rate of the rotational speed of the execution motor is greater than or equal to a preset threshold, braking the execution apparatus.

In some embodiments, the obtaining a load parameter of the execution motor during running of the outdoor robot includes: obtaining a first load parameter at a first time point, and obtaining a second load parameter at a second time point after a preset time interval; and obtaining the change rate parameter of the load of the execution motor based on a difference between the first load parameter and the second load parameter.

In some embodiments, a range of the preset time interval is 0.1 s to 10 s.

the range of the preset time interval is 0.1 s to 2 s.

In some embodiments, the preset time interval is 0.5 s. In some embodiments, the outdoor robot further includes a movement apparatus and a driving motor used for driving the movement apparatus to move, and the control method further includes: when it is determined that the change rate parameter of the load of the execution motor represents that the load increases and the change rate parameter of the load exceeds a preset threshold range, braking the movement apparatus.

In some embodiments, the outdoor robot includes robotic lawnmower, the execution apparatus includes a cutting apparatus, and the execution motor includes a cutting motor.

The embodiments of the present disclosure also provide a control method of an outdoor robot, the outdoor robot includes an execution apparatus and an execution motor for driving the execution apparatus to perform a work task, the control method includes the following steps:

detecting a load parameter of the execution motor during running of the outdoor robot; and if a detection result represents that a load changes abruptly in a rise direction, braking the execution apparatus.

In some embodiments, a change rate parameter of the load is obtained according to the detected load parameter, and when it is determined that the change rate parameter of the load represents that the load increases and the change rate parameter of the load exceeds a preset threshold range, the detection result represents that the load changes abruptly in the rise direction.

In some embodiments, the change rate parameter of the load includes a first derivative or an $n^{th}$ derivative of the load parameter.

In some embodiments, the change rate parameter of the load includes a change amount of the load parameter within a preset time interval, and when it is determined that a change amount of the load parameter represents that the load increases and the change amount of the load parameter within the preset time interval is greater than or equal to a preset threshold, braking the execution apparatus.

the braking the execution apparatus includes reducing or stopping a speed output or an energy output of the execution motor.

In some embodiments, the load parameter includes at least one of a rotational speed of the execution motor, a current of the execution motor, or a torque of the execution motor. In some embodiments, the load parameter of the execution motor includes a rotational speed of the execution motor, and when it is determined that a change rate of the rotational speed of the execution motor is greater than or equal to a preset threshold, a speed output or an energy output of the execution motor is reduced or stopped.

In some embodiments, the obtaining a load parameter of the execution motor during running of the outdoor robot includes: obtaining a first load parameter at a first time point, and obtaining a second load parameter at a second time point after a preset time interval; and obtaining the change rate parameter of the load of the execution motor based on a difference between the first load parameter and the second load parameter.

the range of the preset time interval is 0.1 s to 2 s.

In some embodiments, the preset time interval is 0.5 s.

In some embodiments, the change rate parameter of the load includes a change amount of the load parameter within a preset time interval, and when it is determined that a change amount of the load parameter represents that the load increases and the change amount of the load parameter within the preset time interval is greater than or equal to a preset threshold, braking the execution apparatus.

In some embodiments, the outdoor robot includes robotic lawnmower, the execution apparatus includes a cutting apparatus, and the execution motor includes a cutting motor.

Correspondingly, the embodiments of the present disclosure also provide an outdoor robot, which includes:

a housing; a movement apparatus, mounted on the housing, and used for driving the outdoor robot to move; and an execution apparatus and an execution motor, mounted on the housing, the execution motor running to drive the execution apparatus to perform a work task, the outdoor robot further includes a control apparatus, and the control apparatus is configured to control the execution motor to run to drive the execution apparatus to perform a work task and is configured to control the movement apparatus to drive the outdoor robot to move, the control apparatus is further configured to:

detect a load parameter of the execution motor during running of the outdoor robot; and if a detection result represents that a load changes abruptly in a rise direction, brake the execution apparatus.

In some embodiments, a change rate parameter of the load is obtained according to the detected load parameter, and when it is determined that the change rate parameter of the load represents that the load increases and the change rate parameter of the load exceeds a preset threshold range, the detection result represents that the load changes abruptly in the rise direction.

In some embodiments, the change rate parameter of the load includes a first derivative or an nth derivative of the load parameter.

In some embodiments, the change rate parameter of the load includes a change amount of the load parameter within a preset time interval, and when it is determined that a change amount of the load parameter represents that the load increases and the change amount of the load parameter within the preset time interval is greater than or equal to a preset threshold, braking the execution apparatus.

the braking the execution apparatus includes reducing or stopping a speed output or an energy output of the execution motor.

In some embodiments, the load parameter includes at least one of a rotational speed of the execution motor, a current of the execution motor, or a torque of the execution motor.

In some embodiments, the load parameter of the execution motor includes a rotational speed of the execution motor, and when it is determined that a change rate of the rotational speed of the execution motor is greater than or equal to a preset threshold, a speed output or an energy output of the execution motor is reduced or stopped.

In some embodiments, the obtaining a load parameter of the execution motor during running of the outdoor robot includes: obtaining a first load parameter at a first time point, and obtaining a second load parameter at a second time point after a preset time interval; and obtaining the change rate parameter of the load of the execution motor based on a difference between the first load parameter and the second load parameter.

the range of the preset time interval is 0.1 s to 2 s.

In some embodiments, the preset time interval is 0.5 s.

In some embodiments, the change rate parameter of the load includes a change amount of the load parameter within a preset time interval, and when it is determined that a change amount of the load parameter represents that the load increases and the change amount of the load parameter within the preset time interval is greater than or equal to a preset threshold, braking the execution apparatus.

In some embodiments, the outdoor robot further includes a driving motor connected to the movement apparatus and used for driving the movement apparatus to move, and if the detection result represents that the load changes abruptly in the rise direction, the movement apparatus is braked.

In some embodiments, the outdoor robot includes a robotic lawnmower, the execution apparatus includes a cutting apparatus, and the execution motor includes a cutting motor. According to the outdoor robot and the control method thereof provided in the embodiments of the present disclosure, a load parameter of an execution motor during running of the outdoor robot is obtained, a change rate parameter of a load of the execution motor is obtained according to the load parameter of the execution motor, and a relationship between the change rate parameter of the load and a preset threshold range is determined, to brake running of the execution apparatus. The control method can detect in time and accurately whether the execution apparatus touches an obstacle such as an organism, thereby improving the safety and working efficiency of an outdoor robot.

BRIEF DESCRIPTION OF THE DRAWINGS

To describe the technical solutions of the specific embodiments of the present disclosure or the prior art more clearly, the following briefly introduces the accompanying drawings required for describing the specific embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION

The technical solutions of the present disclosure are clearly and completely described in the following with reference to the accompanying drawings. Apparently, the described embodiments are some rather than all of the embodiments of the present disclosure. All other embodiments obtained by a person of ordinary skill in the art based on the disclosed embodiments without creative efforts shall fall within the protection scope of the present disclosure.

In addition, technical features involved in different embodiments of the present disclosure described below may be combined together if there is no conflict.

The outdoor robot provided in some embodiments of the present disclosure is configured to intelligently perform an operation task, thereby freeing the user from time-consuming and labor-consuming cumbersome work. Outdoor robots may be a gardening robot such as a robotic lawnmower or a leaf collection robot, or may be a gardening robot such as a robotic grass trimmer, a robotic pruner, a robotic grass mower, or may be another type of outdoor robot such as a robotic snow plow.

Figure 1:
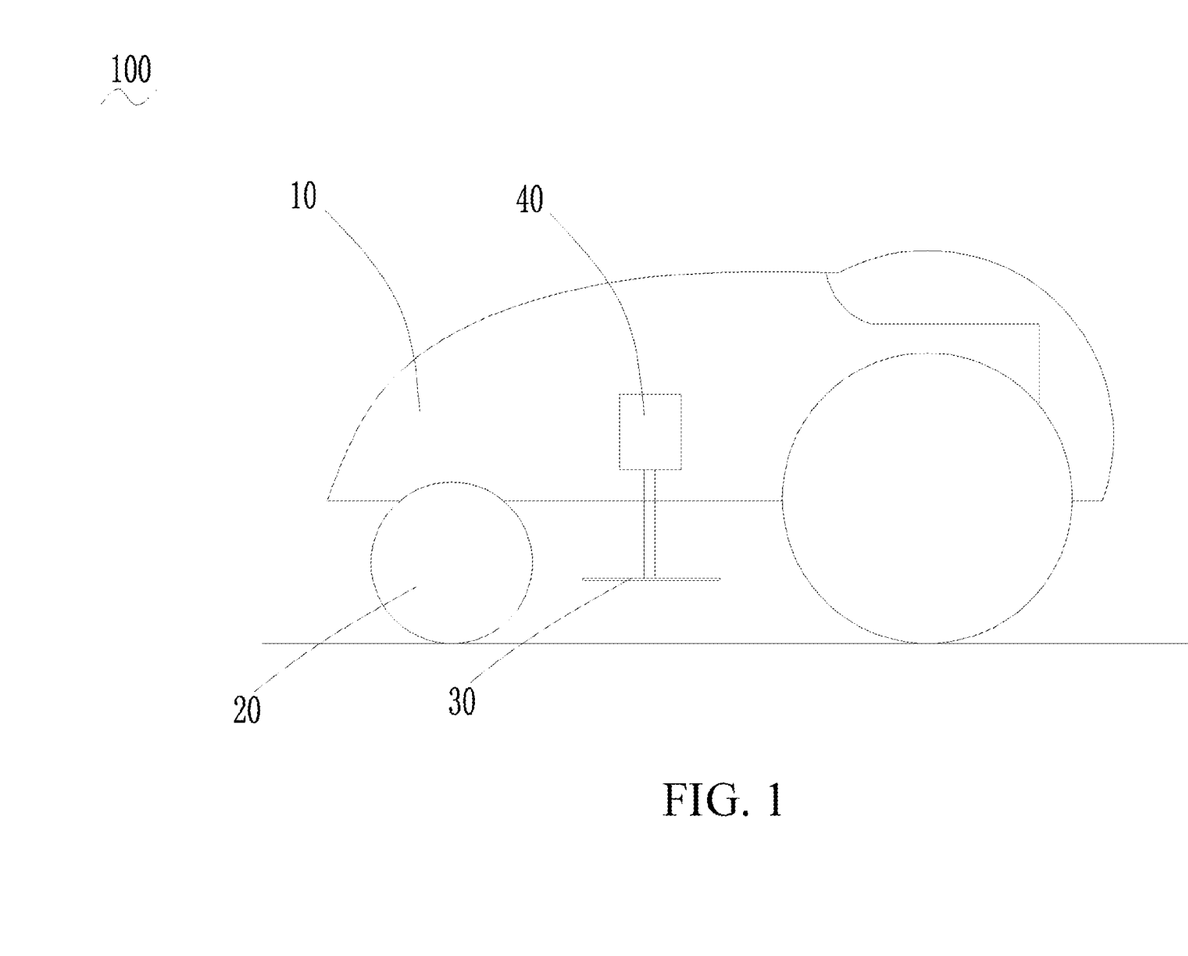
FIG. 1 is a schematic structural diagram of an outdoor robot according to some embodiments.

As shown in FIG. 1, an outdoor robot 100 in some embodiments includes a housing 10, a movement apparatus 20 mounted on the housing 10 and used for driving the outdoor robot to move, and a driving motor (not shown) used for driving the movement apparatus to run. The movement apparatus 20 may be wheel structures mounted on two sides of the housing to support movement of the housing or may be track structures, as long as the outdoor robot can be driven to move. An execution apparatus 30 used for performing a work task and an execution motor 40 for driving the execution apparatus to run are further mounted on the housing 10. In addition, the outdoor robot 100 further includes a control apparatus (not shown). The control apparatus is electrically connected to the execution motor 40, the driving motor, and the like. Specifically, the control apparatus is configured to control the execution motor 40 to run to drive the execution apparatus 30 to perform a work task, and may be further configured to control the driving motor to run to drive the movement apparatus 20 to drive the outdoor robot 100 to move. For example, the outdoor robot 100 is a robotic lawnmower. The execution apparatus 30 is a cutting apparatus performing a cutting task. At least one group of blades are disposed on the cutting apparatus. Driven by the execution motor 40 such as a cutting motor, rotating blades contact weeds in a lawn to cut the weeds. It may be understood that when the outdoor robot is a robotic snow plow, the execution apparatus may be a snow removal apparatus for performing a snow removal task. For example, the snow removal apparatus may be a spiral snow collection apparatus such as a churn or a snow brush. Driven by the execution motor, that is, a snow removal motor, the churn, the snow brush or the like runs to remove accumulated snow on a road.

Figure 2:
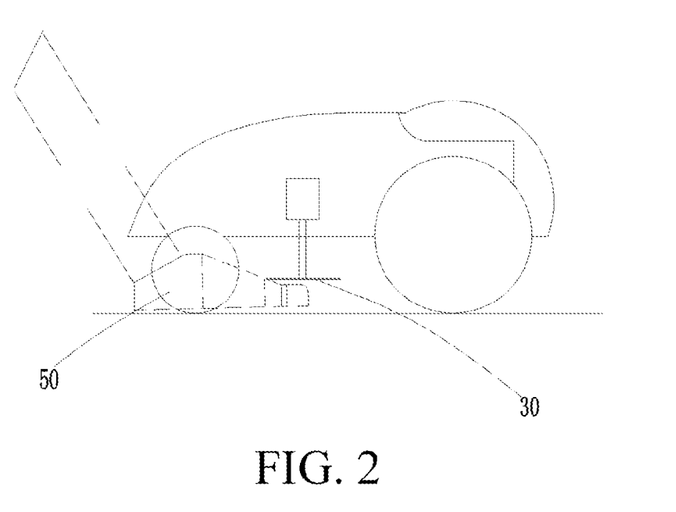
FIG. 2 is a schematic diagram of an outdoor robot touching a child while working in a working area according to some embodiments.

As shown in FIG. 2, when the robotic lawnmower moves in a working area and works, the running cutting apparatus cuts weeds in a lawn. When a foot 50 of a child playing in the working area touches a blade on the cutting apparatus 30 that runs at a high speed, the blade causes harm to the child. Embodiments of the present disclosure provide a control method of an outdoor robot, which can detect in time and accurately whether a child or another object touches an execution apparatus, and quickly brake running of the execution apparatus when detecting that an object touches the execution apparatus, thereby reducing harm to an organism such as a child.

Figure 3:
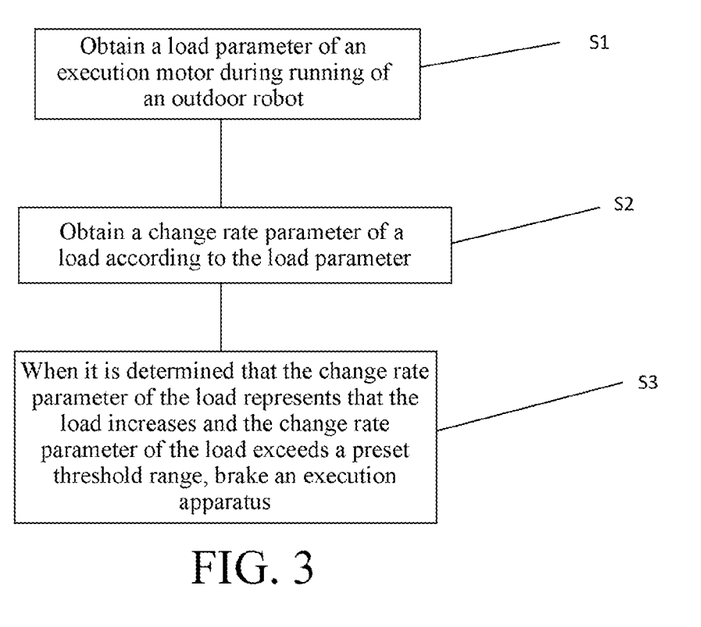
FIG. 3 is a flowchart of a control method of an outdoor robot according to some embodiments.

Some embodiments of the present disclosure provide a control method of an outdoor robot. The method may be performed by a control apparatus in the outdoor robot. As shown in FIG. 3, the control method includes the following steps.

S1: Obtain a load parameter of the execution motor during running of the outdoor robot.

The load parameter of the execution motor in some embodiments may include a rotational speed of the execution motor or may include a current of the execution motor, a torque of the execution motor, or the like. It may be understood that any parameter that can represent a load of the execution motor is feasible. A first load parameter L1 of the execution motor is obtained when the outdoor robot runs to a first time point. A second load parameter L2 of the execution motor is obtained when the outdoor robot runs to a second time point after a preset time interval t. A change rate parameter of the load is obtained according to a relationship between the first load parameter L1 and the second load parameter L2, and a relationship between the change rate parameter of the load and a preset threshold range is determined. If the change rate parameter of the load meets a triggering condition (the triggering condition is described below in detail), running of the execution apparatus is braked. For example, a running speed of the execution apparatus is reduced or the running of the execution apparatus is stopped in a manner of reducing or stopping a speed output or an energy output of the execution motor. If the triggering condition is not met, a third load parameter L3 of the execution motor continues to be obtained at an adjacent time point of the first time point, that is, a third time point. A fourth load parameter L4 of the execution motor is obtained at a fourth time point after the preset time interval following the third time point. The relationship between the change rate parameter of the load and the preset threshold range continues to be determined. If the change rate parameter of the load meets the triggering condition, the running of the execution apparatus is braked. If the triggering condition is still not met, a similar process continues to be performed. An $n^{th}$ load parameter Ln of the execution motor continues to be obtained. After the preset time interval t, an $(n+1)^{th}$ load parameter Ln+1 of the execution motor is obtained. The relationship between the change rate parameter of the load and the preset threshold range continues to be determined. If the change rate parameter of the load meets the triggering condition, the running of the execution apparatus is quickly braked, to reduce harm caused to an object by the execution apparatus. If the triggering condition is not met, load parameters continue to be obtained, until the execution motor completes a work task. A range of the preset time interval t is controlled to be 0.1 s to 10 s. In some embodiments, the range of the preset time interval t is 0.1 s to 2 s. More specifically, the preset time interval may be 0.5 s. The range of the preset time interval t in the embodiments of the present disclosure is appropriate to avoid the following problems. If the time interval is short, the detection of the control apparatus is excessively sensitive and a misdetermination tends to occur. If the time interval is long, the detection is slow, and the control apparatus may fail to detect an abnormal load in time and as a result cause harm to an organism. That is, the preset time interval in some embodiments are set to allow the control apparatus to detect an abnormality in time and accurately and control the outdoor robot in time, thereby reducing harm to an organism.

S2: Obtain a change rate parameter of a load according to the load parameter.

After the first load parameter L1 and the second load parameter L2 are obtained, the change rate parameter of the load is obtained according to a difference between the first load parameter L1 and the second load parameter L2. The change rate parameter of the load may be represented in a plurality of manners. It may be understood that because the preset time interval t is fixed, in some embodiments, a change rate of the load may be represented by obtaining a change amount of the load parameter within the preset time interval t. That is, the change rate parameter of the load is the change amount of the load parameter within the preset time interval. In some embodiments, a specific method may be subtracting a load parameter at a latter time point from a load parameter at a former time point. For example, the second load parameter L2 is subtracted from the first load parameter L1 to calculate a difference d1. The difference d1 may be used as the change rate parameter of the load. A relationship between the difference d1 and the preset threshold range is determined. If the triggering condition is met, the running of the execution apparatus is braked. If the triggering condition is not met, after the third load parameter L3 and the fourth load parameter L4 are obtained, the fourth load parameter L4 continues to be subtracted from the third load parameter L3 to calculate a difference d2. A relationship between the change rate parameter d2 of the load and a preset threshold range continues to be determined. If the triggering condition is met, the running of the execution apparatus is braked. If the triggering condition is still not met, a difference between the $n^{th}$ load parameter Ln and the $(n+1)^{th}$ load parameter Ln+1 continues to be obtained. If the difference meets the triggering condition, the speed output or the energy output of the execution motor is reduced or stopped, to brake the running of the execution apparatus, thereby reducing harm caused to an object by the execution apparatus. If the triggering condition is not met, load parameters continue to be obtained and a difference between the load parameters is calculated to obtain the change rate parameter of the load, until the execution motor completes a work task. In some embodiments, the change rate parameter of the load may be represented by calculating the first derivative or an $n^{th}$ derivative of the load parameter. The first derivative is used as an example. That is, the change rate parameter of the load is represented by using a ratio of a change of the load parameter to the preset time interval t, that is, represented by using a slope value in a coordinate system formed by the load parameter and time. For example, the load parameter L2 at the second time point is subtracted from the load parameter L1 at the first time point to obtain a difference, and the difference is divided by the preset time interval t to obtain a quotient value k1. k1 may be used as the change rate parameter of the load. A relationship between k1 and the preset threshold range is determined. If the triggering condition is met, the running of the execution apparatus is braked. If the triggering condition is not met, load parameters continue to be obtained, the change rate parameter kn of the load is calculated by using the same method, and a relationship between the change rate parameter kn of the load and a preset threshold range is determined, until the execution apparatus completes a work task. In the embodiments of the present disclosure, the method for obtaining the change rate parameter of the load can reflect an actual working condition of the execution motor more accurately, and detect an abnormal load more accurately according to the actual working condition, thereby improving the safety of an outdoor robot.

In some embodiments, in step S2, a method of subtracting a load parameter at a former time point from a load parameter at a latter time point may be used to calculate the change rate parameter of the load. For example, the first load parameter L1 is subtracted from the second load parameter L2 to calculate a difference d1'. A relationship between d1' and the preset threshold range is determined. If the triggering condition is met, the execution apparatus is braked. If the triggering condition is not met, load parameters continue to be obtained, and a method of subtracting a load parameter at a former time point from a load parameter at a latter time point continues to be used to calculate the change rate parameter of the load, until the execution apparatus is braked or the execution apparatus completes a work task. It may be understood that in the embodiments of using the change amount of the load parameter within the preset time interval to represent the change rate of the load, in both methods of subtracting a load parameter at a latter time point from a load parameter at a former time point and subtracting a load parameter at a former time point from a load parameter at a latter time point to form a difference to obtain the change rate parameter of the load, the change amount of the load parameter is a positive value. Therefore, values for representing the change rate of the load have the same magnitude and direction. In the embodiments of using the first derivative or the $n^{th}$ derivative of the load parameter to represent the change rate of the load, a change rate of the load calculated by subtracting a load parameter at a former time point from a load parameter at a latter time point to form a difference and a change rate of the load calculated by subtracting a load parameter at a latter time point from a load parameter at a former time point to form a difference in the foregoing embodiments have the same magnitude but opposite directions. Therefore, a case of exceeding the preset threshold range in the triggering condition is correspondingly that the change rate parameter of the load is greater than or equal to a preset threshold or is less than or equal to a preset threshold.

To facilitate subsequent determination, in the embodiments of the present disclosure, the calculated change rate parameter of the load may be increased by a preset multiple to perform determination.

S3: When it is determined that the change rate parameter of the load represents that the load increases and the change rate parameter of the load exceeds a preset threshold range, brake the execution apparatus.

It may be understood that experiments may be performed to measure data representing the value of the load parameter of the execution motor when an object such as an organism touches the execution apparatus. The preset threshold range is set according to experimental results. The triggering condition is set inside the control apparatus. The triggering condition is related to the change rate parameter of the load and the preset threshold range. For example, the triggering condition is that the change rate parameter of the load of the execution motor represents that the load increases and the change rate parameter of the load exceeds the preset threshold range. That is, in a manner, the triggering condition is that the change amount of the load parameter within the preset time interval represents that the load increases and the change amount of the load parameter within the preset time interval is greater than or equal to a preset threshold. During running of the execution motor, when the obtained change amount of the load parameter meets the triggering condition, the control apparatus brakes the running of the execution apparatus. In another manner, the triggering condition is that the first derivative or the $n^{th}$ derivative of the load parameter represents that the load increases and the first derivative or the $n^{th}$ derivative of the load parameter exceeds a preset threshold range. During running of the execution motor, when the obtained first derivative or $n^{th}$ derivative of the load parameter meets the triggering condition, the running of the execution apparatus is braked. It may be understood that if the execution apparatus touches an obstacle such as an organism during running, a load to be processed by the execution apparatus is much greater than a load during normal operation. In this case, the load of the execution apparatus definitely increases. Therefore, for one of the conditions that can determine whether the execution apparatus touches an obstacle, the triggering condition is set as that the change rate parameter of the load of the execution motor represents that the load increases.

A manner in which the control apparatus reduces or stops the speed output or the energy output of the execution motor includes, but not limited to, that the control apparatus performs control to stop the energy output of the execution motor or reduce the energy output of the execution motor to brake the running of the execution motor to eventually brake the running of the execution apparatus, or stop the speed output of the execution motor or reduce the speed output of the execution motor to brake the running of the execution apparatus, or disengage a clutch from the execution apparatus to interrupt the speed output or the energy output of the execution motor to brake the running of the execution apparatus, to eventually reduce the running speed of the execution apparatus or stop the running of the execution apparatus, thereby reducing harm to an organism.

It may be understood that for an outdoor robot, for different working conditions, loads performed by the execution apparatus are different. When the loads are different, the preset threshold ranges or triggering conditions are also different. Specifically, the preset threshold range or triggering condition is determined according to a current load.

Figure 4:
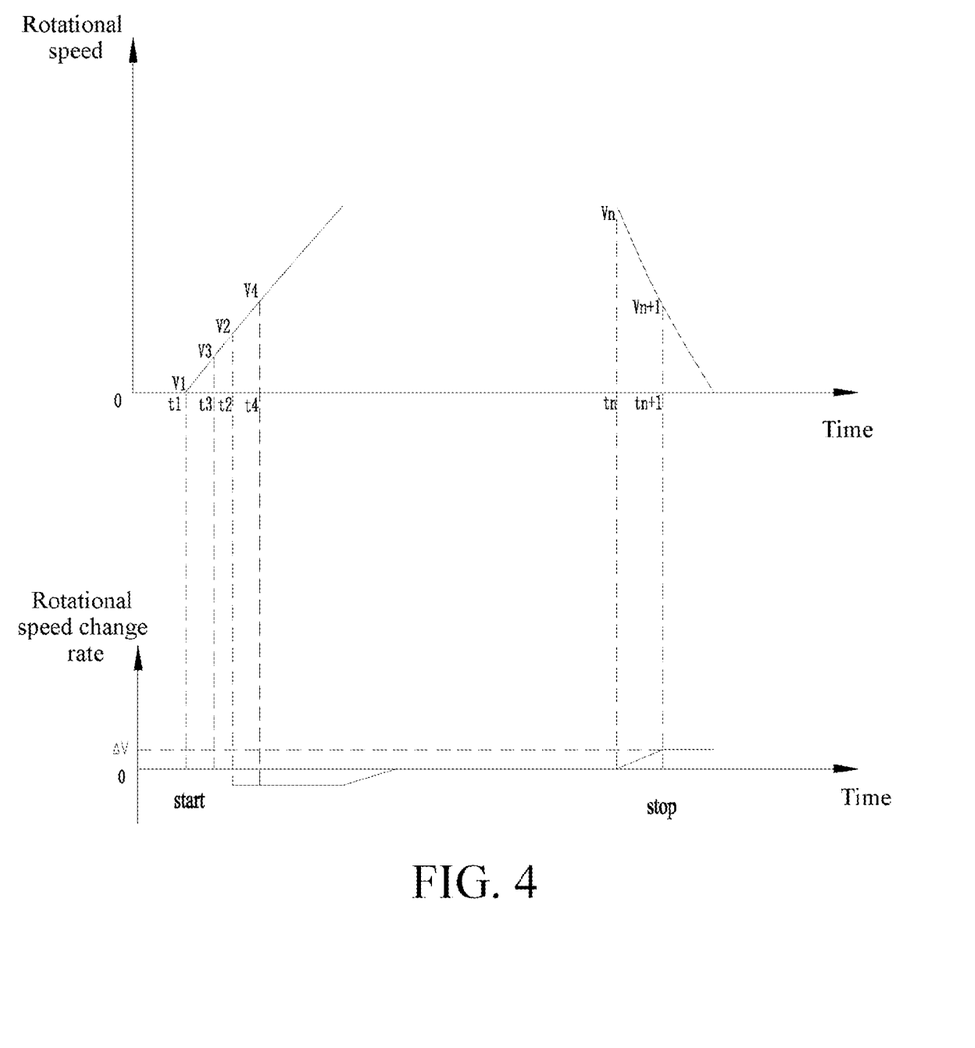
FIG. 4 is a schematic diagram of a correspondence relationship between a rotational speed and a rotational speed change rate of an execution motor during running of the execution motor according to some embodiments.

For the foregoing control method, for example, the outdoor robot is a robotic lawnmower, and the load parameter is a rotational speed of a cutting motor. As shown in FIG. 4, when the robotic lawnmower is started, the control apparatus starts running of an execution motor. To make the execution apparatus reach a normal operating state, within a period of time after start, the rotational speed of the execution motor rises quickly. When the rotational speed reaches the speed of normal running, the execution apparatus is normally started. When the execution apparatus runs normally, the rotational speed of the execution motor basically remains unchanged. In step S1, the rotational speed of the execution motor is obtained by using a rotational speed detection apparatus. For example, a current of the execution motor is obtained by using a current detection circuit to calculate a rotational speed during running of the execution motor. That is, a first rotational speed V1 at a first time point t1 and a second rotational speed V2 at a second time point t2 after a preset time interval t are obtained. In Step S2, a difference between the first rotational speed V1 and the second rotational speed V2 is calculated to calculate a change amount of a rotational speed within a preset time period to represent a change rate of the rotational speed. In step S3, a relationship between the rotational speed change rate and a preset threshold range is determined, and if the rotational speed change rate meets a triggering condition, that is, the rotational speed change rate represents that the load increases, and the rotational speed change rate exceeds the preset threshold range, running of the cutting apparatus is braked. Specifically, if a method for calculating the rotational speed change rate in step S2 is a method of subtracting the second rotational speed V2 from the first rotational speed V1 to obtain a difference to represent the rotational speed change rate, in step S3, the triggering condition is that a rotational speed drop represents that the load increases and a change rate of the rotational speed drop is greater than or equal to a preset threshold, the cutting apparatus is braked. If the change rate of the rotational speed drop meets the triggering condition, the control apparatus brakes the running of the cutting apparatus. If the change rate does not meet the triggering condition, a third rotational speed V3 at a third time point t3 and a fourth rotational speed V4 at a fourth time point after the preset time interval t continue to be obtained, a difference between the third rotational speed V3 and the fourth rotational speed V4 is calculated to calculate the change rate of the rotational speed drop, and it is determined whether the change rate of the rotational speed drop meets the triggering condition. If the triggering condition is met, the running of the cutting apparatus is braked. If the triggering condition is not met, steps S1 to S3 continue to be repeated. That is, an $n^{th}$ rotational speed Vn at an $n^{th}$ time point and an $(n+1)^{th}$ rotational speed Vn+1 at an $(n+1)^{th}$ time point after the preset time interval t are obtained, and a difference between Vn and Vn+1 is calculated to determine whether the change rate of the rotational speed drop meets the triggering condition, until the execution apparatus is braked or the execution apparatus completes a work task. It may be understood that in some embodiments, in step S2, a method of subtracting the first rotational speed V1 from the second rotational speed V2 to obtain a difference may be used to calculate the rotational speed change rate.

Specifically, in a fast start stage of the cutting apparatus, the rotational speed change rate obtained by using the foregoing method can be used to determine that the rotational speed of the cutting motor rises. When the rotational speed rises, it indicates that the load of the execution apparatus does not increase. In this case, it may be determined that the rotational speed change rate of the cutting motor does not meet the triggering condition. The control apparatus continues to obtain a rotational speed, and calculates a rotational speed change rate. When the cutting apparatus normally mows a lawn, the rotational speed of the cutting apparatus basically remains stable and unchanged. Therefore, the rotational speed change rate obtained by using the foregoing method can be used to determine that the rotational speed of the cutting motor basically remains unchanged. When the rotational speed remains unchanged, it may represent that the load of the execution apparatus does not increase. In this case, it may be determined that the cutting apparatus does not touch an obstacle such as an organism. The control apparatus continues to obtain load parameters. When an organism such as a child touches the cutting apparatus, that is, the cutting apparatus touches an abnormal load, the rotational speed of the cutting apparatus drops rapidly. Therefore, when the rotational speed change rate is obtained by using the foregoing method, it can be determined that the rotational speed drops. When the rotational speed drops, it represents that the load increases, and the change rate of the rotational speed drop is greater than or equal to the preset threshold. For example, it is detected at a moment tn+1 in FIG. 4 that the change rate of the rotational speed drop is greater than or equal to a preset threshold ΔV. In this case, it may be determined that the cutting apparatus touches an obstacle such as an organism. In this case, the control apparatus brakes the running of the cutting apparatus, thereby reducing harm to an organism such as a child. Further, the running of the movement apparatus may be further braked, to avoid a case such as that the running movement apparatus further runs over the child.

In some embodiments of the present disclosure, the current of the execution motor may be used as a load parameter of the execution motor. A current change rate parameter of the execution motor is used as a reference to determine whether the execution apparatus touches an obstacle such as an organism.

Figure 5:
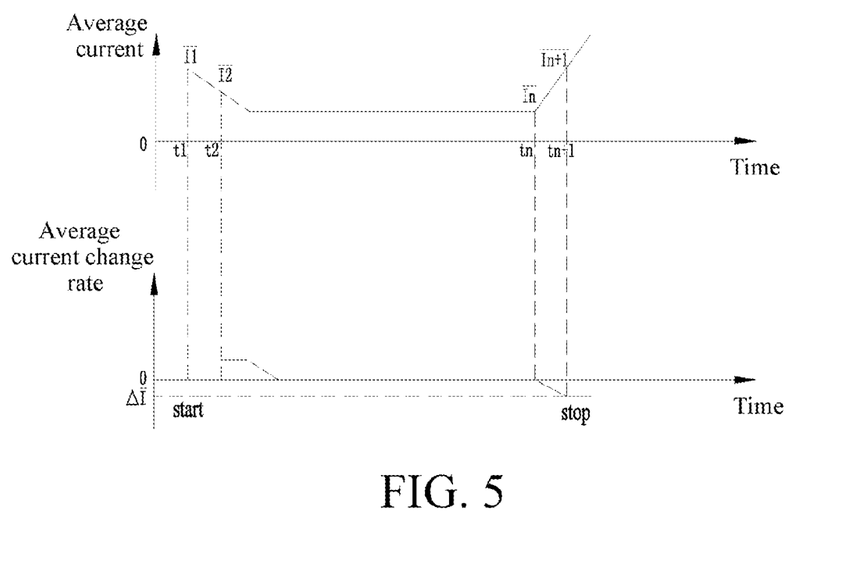
FIG. 5 is a schematic diagram of a correspondence relationship between an average current and an average current change rate of an execution motor during running of the execution motor according to some embodiments.

For example, the outdoor robot is a robotic lawnmower, and the load parameter is a current of a cutting motor. It may be understood that to facilitate calculation, an average current of an execution motor is used to calculate a change rate parameter of a load. In a specific method, a circuit acquisition circuit is used to acquire n running current values $I_1, \ldots,$ and $I_n$ when the cutting motor runs to a moment. A control apparatus then calculates an average current value of the n running current values. For example, a plurality of running current values within a particular time before and after a time point t1 are obtained. The plurality of current values are averaged. For example, an average current value $\bar{I}_1$ at the moment t1 is calculated by using an integral algorithm. Similarly, a plurality of running current values within a particular time before and after a time point t2 after a preset time interval are obtained. An average current value $\bar{I}_2$ at the moment t2 is calculated by using an integral algorithm. Currents in the control method described below are all average currents. Details of a specific method of obtaining an average current value at a moment are not described again below. In step S1, a first average current $\bar{I}1$ at the first time point t1 and a second average current $\bar{I}2$ at a second time point t2 after a preset time interval t are obtained. In step S2, a difference between the first average current $\bar{I}_1$ and the second average current $\bar{I}2$ is calculated to represent an average current change rate. That is, in step S2, a change amount of the average current within a preset time interval is calculated to represent the average current change rate. In step S3, a relationship between the average current change rate and a preset threshold range is determined, and if the average current change rate meets a triggering condition, that is, the average current change rate represents that the load increases, and the average current change rate exceeds a preset threshold range, the running of the cutting apparatus is braked. Specifically, when the cutting apparatus touches an obstacle such as an organism, the average current of the execution motor rises. Therefore, the triggering condition is set as that an average current rise represents that the load increases, and a change rate of the average current rise is greater than or equal to a preset threshold. If the change rate of the average current rise meets the triggering condition, the control apparatus brakes the running of the cutting apparatus. If the change rate does not meet the triggering condition, steps S1 to S3 continue to be repeated. That is, an $n^{th}$ average current $\bar{I}_n$ at an $n^{th}$ time point and an $(n+1)^{th}$ average current $\bar{I}_{n+1}$ at an $(n+1)^{th}$ time point after the preset time interval t are obtained, and a difference between $\bar{I}_n$ and $\bar{I}_{n+1}$ is calculated to determine whether the change rate of the average current rise meets the triggering condition, until the execution apparatus is braked or the execution apparatus completes a work task. It may be understood that in step S2, a method of subtracting the second average current from the first average current to obtain a difference may be used to calculate the average current change rate, or a method of subtracting the first average current $\bar{I}_1$ from the second average current $\bar{I}_2$ to obtain a difference may be used to calculate the average current change rate.

As shown in FIG. 5, when the cutting apparatus is started, the current is maximum, and then gradually becomes stable. Therefore, in a start stage, a change rate of an average current value obtained by using the foregoing method can be used to determine that an average current value of the cutting motor drops. The drop in the average current value represents that the load of the cutting apparatus does not increase. In this case, it may be determined that the average current change rate of the cutting motor does not meet the triggering condition. The control apparatus continues to obtain the average current, and calculates the average current change rate. When the cutting apparatus normally mows a lawn, the average current of the cutting apparatus basically remains stable and unchanged. Therefore, the average current change rate obtained by using the foregoing method can be used to determine that the average current of the cutting motor basically remains unchanged. When the average current remains unchanged, it may represent that the load of the execution apparatus does not increase. In this case, it may be determined that the cutting apparatus does not touch an obstacle such as an organism. In this case, the control apparatus continues to obtain the average current. When an organism such as a child touches the cutting apparatus, that is, the cutting apparatus touches an abnormal load, the average current of the cutting apparatus rises rapidly. Therefore, when the average current change rate is obtained by using the foregoing method, it can be determined that the average current rises abruptly. An average current rise represents that the load increases, and a change rate of the average current rise is greater than or equal to a preset threshold. In this case, it may be detected that the cutting apparatus touches an obstacle such as an organism. For example, it is detected at a moment tn+1 in FIG. 5 that the change rate of the average current rise is greater than or equal to a preset threshold $\alpha \bar{I}$. In this case, the control apparatus reduces or stops a speed output or an energy output of the cutting motor, to brake the running of the cutting apparatus, thereby reducing harm to an organism such as a child. Further, the control apparatus may further perform control to reduce or stop the speed output or energy output of the driving motor, to brake the running of the movement apparatus, thereby avoiding a case such as that the running movement apparatus further runs over the child.

It may be understood that a method of the first derivative or an $n^{th}$ derivative of the average current value may be used to represent the average current change rate. The principle is similar to those in the foregoing embodiments. Details are not described again.

Figure 6:
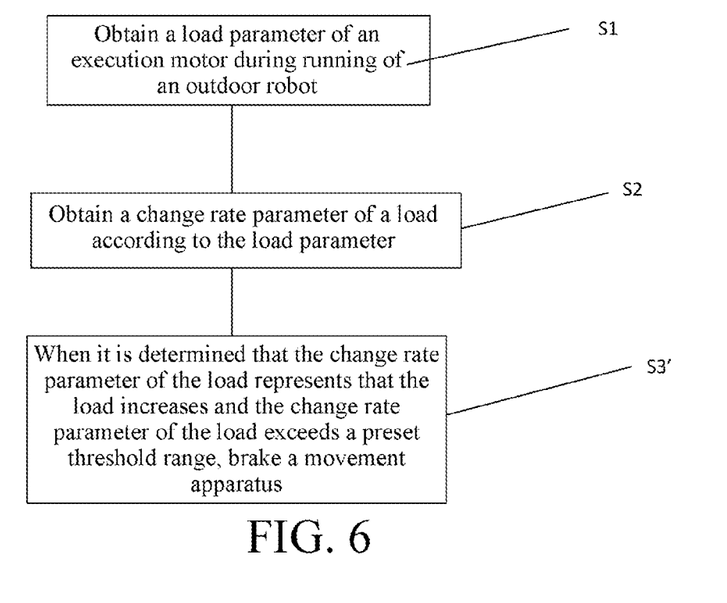
FIG. 6 is a flowchart of a control method of an outdoor robot according to still some embodiments.

As shown in FIG. 6, still some embodiments of the present disclosure is provided. A difference from the foregoing embodiments lies in that after step S2, the method further includes the following step S3':

When it is determined that the change rate parameter of the load of the execution motor represents that the load increases and the change rate parameter of the load exceeds a preset threshold range, running of the movement apparatus is braked. That is, when detecting that an obstacle such as an organism touches the execution apparatus, the control apparatus reduces or stops the speed output or the energy output of the driving motor to brake the running of the movement apparatus, to prevent the movement apparatus from continuing moving to further harm the organism touching the execution apparatus. A specific manner of reducing or stopping the speed output or the energy output of the driving motor is similar to a manner of reducing or stopping the speed output or the energy output of the execution motor in the foregoing embodiments. Details are not described again. It may be understood that step S3' and step S3 may be performed simultaneously, or step S3 may be performed first and step S3' is then performed. That is, when the change rate parameter of the load of the execution motor meets the triggering condition, the control apparatus simultaneously brakes running of the execution apparatus and the movement apparatus, or the control apparatus brakes the running of the execution apparatus first and then brakes the running of the movement apparatus.

Figure 7:
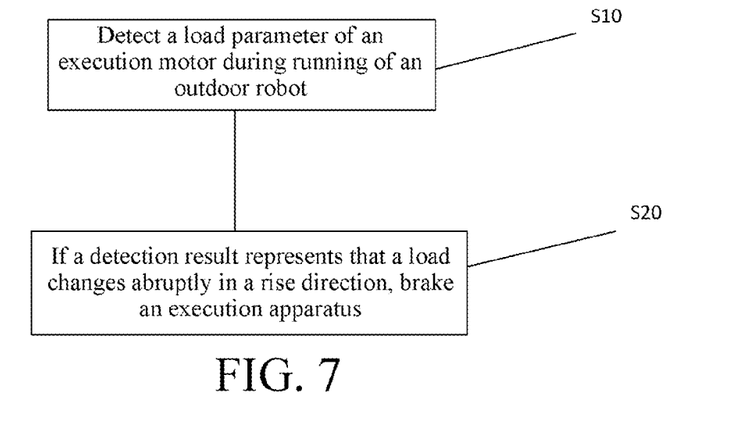
FIG. 7 is a flowchart of a control method of an outdoor robot according to yet some embodiments.

As shown in FIG. 7, yet some embodiments of the present disclosure provides a control method of an outdoor robot. The structure of the outdoor robot is similar to the structures in the foregoing embodiments. Details are not described again. The control method of the outdoor robot includes the following steps.

S10: Detect a load parameter of the execution motor during running of the outdoor robot.

S20: If a detection result represents that a load changes abruptly in a rise direction, brake the execution apparatus.

Step S10 is the same as the method of obtaining a load parameter described in step S1 in the foregoing embodiments. In both the steps, a first load parameter at a first time point is obtained, and a second load parameter at a second time point after a preset time interval t is obtained. Next, a change rate parameter of the load is obtained according to the detected load parameter. A method of obtaining a change rate parameter of a load is the same as the method of step S2 in the foregoing embodiments. In step S20, if the change rate of the load represents that the load increases suddenly, that is, the load changes abruptly in the rise direction, the running of the execution apparatus is braked.

The types of loads of the execution motor and representation forms of the change rate parameters of the loads are all the same as those in the foregoing embodiments. For example, the load parameter includes at least one of a rotational speed of the execution motor, a current of the execution motor, or a torque of the execution motor. The change rate parameter of the load is, for example, represented by the first derivative or an $n^{th}$ derivative of the load parameter. If the first derivative or the $n^{th}$ derivative of the load parameter represents that the load increases and exceeds a preset threshold range, braking the execution apparatus. Alternatively, the change rate parameter of the load may be represented by a change amount of the load parameter within the preset time interval. If the change amount of the load parameter represents that the load increases and the change amount of the load parameter within the preset time interval is greater than or equal to a preset threshold, braking the execution apparatus.

It may be understood that the implementations of the method of obtaining a load parameter, the method of obtaining a change rate parameter of a load, the method for braking an execution apparatus, the method for braking a movement apparatus, the selection of a range of the preset time interval, and the like are all the same those in the foregoing embodiments. Details are not described again.

According to the control method of an execution motor of an outdoor robot provided in the embodiments of the present disclosure, a load parameter of the execution motor and a load parameter within a preset time interval are obtained in real time to obtain a change rate parameter of a load, the change rate parameter of the load reflects more accurately whether the execution motor touches an obstacle such as a child's arm, and running of an execution apparatus is braked when it is detected that the execution motor touches an obstacle such as an organism, so that while harm to the organism is reduced, the working efficiency of an outdoor robot can be further improved.

Obviously, the foregoing embodiments are merely examples for clear description, and are not intended to limit the implementations. A person of ordinary skill in the art may further make other various forms of changes or variations on the basis of the foregoing descriptions. It is neither necessary nor possible to exhaust all the embodiments herein. The obvious changes and modifications derived from the foregoing descriptions still fall within the protection scope of the present disclosure.

What is claimed is:

1. A control method of an outdoor robot, wherein the control method comprises:
   obtaining a load parameter of an execution motor of the outdoor robot during running of the outdoor robot;
   obtaining a change rate parameter of a load according to the load parameter; and
   in response to determining that the change rate parameter of the load represents that the load increases and the change rate parameter of the load exceeds a preset threshold range, detecting that an obstacle is present on a path of the outdoor robot, and braking an execution apparatus of the outdoor robot.

2. The control method according to claim 1, wherein the change rate parameter of the load comprises a first derivative or an nth derivative of the load parameter.

3. The control method according to claim 1, wherein the change rate parameter of the load comprises a change amount of the load parameter within a preset time interval, and in response to determining that a change amount of the load parameter represents that the load increases and the change amount of the load parameter within the preset time interval is greater than or equal to a preset threshold, braking the execution apparatus.

4. The control method according to claim 1, wherein braking the execution apparatus comprises reducing or stopping a speed output or an energy output of the execution motor.

5. The control method according to claim 1, wherein the load parameter of the execution motor comprises at least one of a speed of the execution motor, a current of the execution motor, or a torque of the execution motor.

6. The control method according to claim 1, wherein obtaining the load parameter of the execution motor of the outdoor robot during the running of the outdoor robot comprises:
   obtaining a first load parameter at a first time point, and obtaining a second load parameter at a second time point after a preset time interval; and
   obtaining the change rate parameter of the load of the execution motor based on a difference between the first load parameter and the second load parameter.

7. The control method according to claim 6, wherein a range of the preset time interval is 0.1 s to 10 s.

8. The control method according to claim 7, wherein the range of the preset time interval is 0.1 s to 2 s.

9. The control method according to claim 1, wherein the outdoor robot further comprises a movement apparatus and a driving motor used for driving the movement apparatus to move, and the control method further comprises: in response to determining that the change rate parameter of the load of the execution motor represents that the load increases and the change rate parameter of the load exceeds the preset threshold range, braking the movement apparatus.

10. An outdoor robot, comprises:
    a housing;
    a movement apparatus, mounted on the housing, and used for driving the outdoor robot to move;
    an execution apparatus and an execution motor, mounted on the housing, the execution motor running to drive the execution apparatus to perform a work task; and
    a control apparatus comprising one or more processors and memory, the control apparatus configured to;
       control the execution motor to run to drive the execution apparatus to perform the work task;
       control the movement apparatus to drive the outdoor robot to move;
       obtain a load parameter of the execution motor during running of the outdoor robot;
       obtain a change rate parameter of a load according to the load parameter; and
       in response to determining that the change rate parameter of the load represents that the load increases and the change rate parameter of the load exceeds a preset threshold range, detect that an obstacle is present on a path of the outdoor robot, and brake the execution apparatus.

11. The outdoor robot according to claim 10, wherein the change rate parameter of the load comprises a first derivative or an nth derivative of the load parameter.

12. The outdoor robot according to claim 10, wherein the change rate parameter of the load comprises a change amount of the load parameter within a preset time interval, and in response to determining that a change amount of the load parameter represents that the load increases and the change amount of the load parameter within the preset time interval is greater than or equal to a preset threshold, the control apparatus is further configured to brake the execution apparatus.

13. The outdoor robot according to claim 12, wherein a range of the preset time interval is 0.1 s to 2 s.

14. The outdoor robot according to claim 10, wherein the outdoor robot comprises a robotic lawnmower, the execution apparatus comprises a cutting apparatus, and the execution motor comprises a cutting motor.

15. A control method of an outdoor robot, the control method comprising:
    detecting a load parameter of an execution motor of an outdoor robot during running of the outdoor robot; and
    if a detection result represents that a load changes abruptly in a rise direction, detecting that an obstacle is present on a path of the outdoor robot, and braking an execution apparatus of the outdoor robot.

16. The control method according to claim 15, wherein a change rate parameter of the load is obtained according to the load parameter, and in response to determining that the change rate parameter of the load represents that the load increases and the change rate parameter of the load exceeds a preset threshold range, the detection result represents that the load changes abruptly in the rise direction.

17. The control method according to claim 16, wherein the change rate parameter of the load comprises a first derivative or an nth derivative of the load parameter.

18. The control method according to claim 16, wherein the change rate parameter of the load comprises a change amount of the load parameter within a preset time interval, and in response to determining that a change amount of the load parameter represents that the load increases and the change amount of the load parameter within the preset time interval is greater than or equal to a preset threshold, braking the execution apparatus.

19. The control method according to claim 15, wherein braking the execution apparatus comprises reducing or stopping a speed output or an energy output of the execution motor.

20. The control method according to claim 15, wherein the load parameter comprises at least one of a speed of the execution motor, a current of the execution motor, or a torque of the execution motor.

* * * * *